Nov. 10, 1964 S. KOWALYSHYN 3,156,208
METHOD AND APPARATUS FOR SELF NOISE
TESTS FOR SUBMERGED VEHICLES
Filed Nov. 9, 1961

INVENTOR.
STEPHEN KOWALYSHYN
BY
ATTORNEY.

United States Patent Office 3,156,208
Patented Nov. 10, 1964

3,156,208
METHOD AND APPARATUS FOR SELF NOISE TESTS FOR SUBMERGED VEHICLES
Stephen Kowalyshyn, Ellicott City, Md., assignor, by mesne assignments, to the United States of America as represented by the Secretary of the Navy
Filed Nov. 9, 1961, Ser. No. 151,404
4 Claims. (Cl. 114—25)

This invention relates to methods and apparatus for determining the relationship between the depth and self noise interferences for underwater vehicles carrying acoustic equipment.

For purposes of this specification "self noise" is hereby defined as the acoustic noise generated by a "submerged vehicle" within the useful frequency band of "acoustic apparatus" carried by the vehicle; and the "high self noise stratum" as the depth stratum immediately subjacent the surface of the body of water. In this stratum self noise becomes greater as the depth of operation becomes shallower. Such inverse relationship of noise and depth generally results from (1) decrease of the hydrostatic pressure as depth becomes shallower, causing increased generation of cavitation noises by the rapid movements of propeller blades, and (2) increased intensity of reflection of radiated propulsion noises from the air-to-water interface as the distance to the surface decreases. In the art of acoustic homing torpedoes the high self noise stratum is commonly considered to extend from the surface down to a predetermined depth depending upon the sensitivtiy of the particular torpedo.

In the present state of the art of acoustic torpedoes, the acoustic systems are capable of sensitivities permitting the system to be responsive to input levels below the level of self noise generated by the torpedo in the upper portion of the self noise stratum. It is therefore necessary to provide features in the overall torpedo control system to avoid undesired interference by self noise upon the operation of the acoustic system, such as providing a ceiling to the range of operating depth of the torpedo so that it will not rise to the depth where self noise causes interference, or decreasing the sensitivity of the homing system as the torpedo rises in the high self noise stratum. An example of a control feature of the latter type is disclosed in U.S. Patent 3,015,297, entitled "Enabling Device for Acoustic Torpedo Homing Systems." Before such features may be designed, it is necessary to determine the relationship between the operating depth and the interference caused by the torpedo vehicle upon the acoustic system to be carried by the vehicle, and more particularly the information regarding the parameters shown by plot in FIG. 2 of the previously mentioned co-pending application. It is virtually impossible to determine this relationship by analytical methods because of the many design factors not subject to precise mathematical treatment, such as design and speed of rotation of the propellers, speed and hydrodynamic shape of the torpedo body and sensitivity and directional characteristics of the transducer.

It is therefore necessary to conduct "test runs" of the torpedo vehicle by which the effect of the self noise on the acoustic system is observed. In conducting these test runs it has heretofore been necessary to provide a testing program including a multiplicity of individual horizontal runs, at discrete increments of depth within the high noise stratum, until the critical depth at which self noise just commences to cause interference is found. Finding this critical depth is difficult because in most acoustic homing systems the only indicia of self noise interference is the actuation of some relay, which merely indicates that the self noise limit has been exceeded, so that further "cut and try" techniques of bracketing the critical depth at which interference starts to take place was necessary. The multiplicity of runs has been a serious problem prior to the present invention because of the expense and time required to undertake the tests, including the time spent disassembling and reassembling the torpedo after each run and replacing expended components. Moreover, such tests are commonly conducted at the stage in the design and development of a torpedo when time is at a premium and only a few prototype models are available. It therefore has been a heretofore unobtained objective to reduce the number of trial runs necessary to determine the relationship between depth and self noise interference. Solution of the problem is made even more difficult because the self noise phenomenon has inherent random qualities, and therefore requires further multiplicity of individual runs to obtain a large enough sample of data to provide an average value.

Prior attempts to solve the problem have proposed programming a torpedo to follow a gradually inclined trajectory through the depth stratum of interest accompanied by suitable observation of any self noise interference. Such attempts were not satisfactory because the inclined trajectories produced an inter-action between the highly directional receiving characteristics of the transducer and the noise reflected from the air-to-water interface, resulting in substantial errors. It is an object of the present invention to provide a method and apparatus for determining the average operating depth of an acoustic torpedo at which self noise commences to interfere with the operation of the acoustic system, with which such average depth can be obtained in a single run.

Another object is to provide an improved method and apparatus for determining the relationship between depth and self noise interference with which such relationship can be determined in a single torpedo run.

Another object is to provide apparatus in accordance with the preceding objectives requiring comparatively few and inexpensive parts in addition to those already existing in the torpedo to be tested.

Other objects and many of the attendant advantages of this invention will be readily appreciated as the same becomes better understood by reference to the following detailed description when considered in connection with the accompanying drawings wherein.

Figure 1:
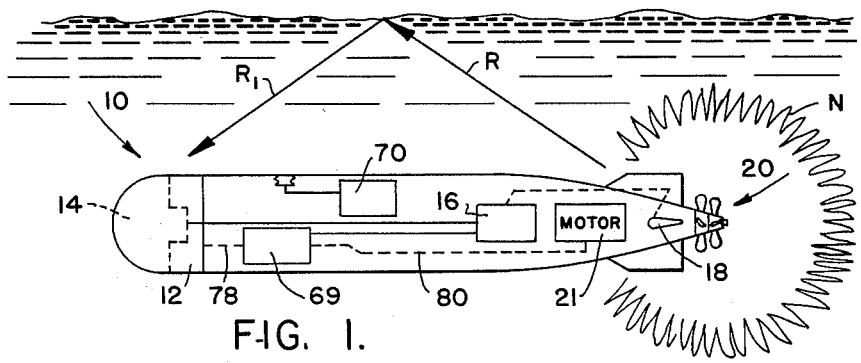
FIG. 1 is a view of an acoustic torpedo running at a depth close to the surface of the water, and which diagrammatically depicts the self noise phenomenon.
Figure 2:
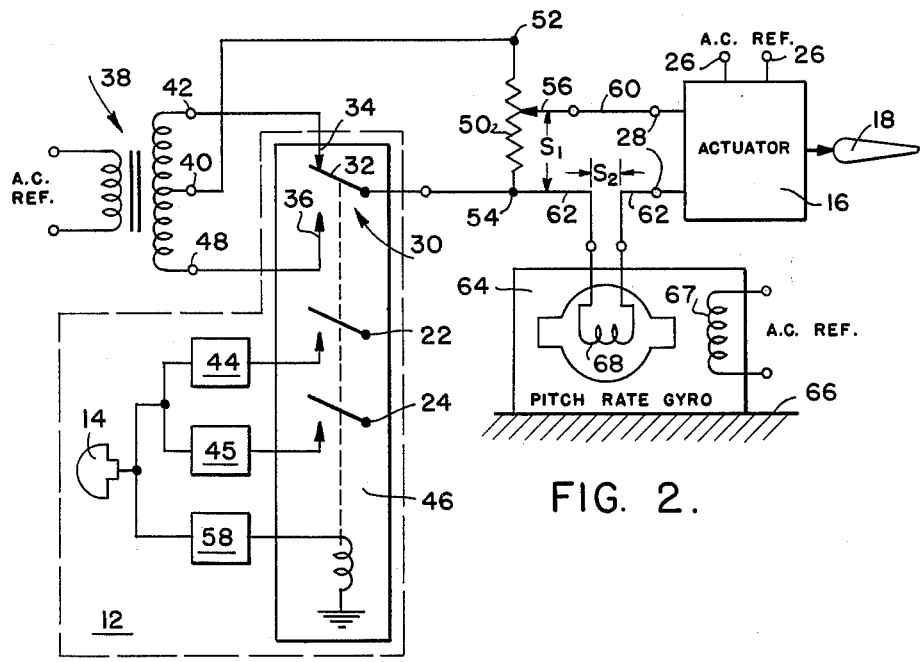
FIG. 2 is an electrical schematic of the depth steering control apparatus in the torpedo of FIG. 1.

Referring now to FIG. 1, a torpedo 10 contains apparatus by which a test run may be conducted in accordance with the present invention including an acoustic system 12 for generating a steering signal, and a transducer 14 mounted at the nose of the torpedo, which forms the acoustic input of the system. A depth steering actuator 16 positions a depth steering control surface or rudder 18, and the torpedo is propelled by a set of propellers 20 driven by a motor 21.

Acoustic system 12 is of a type subject to interference by self noise, exemplary of which is the system disclosed in U.S. Patent 3,024,755, entitled "Torpedo Echo Steering System," the like components herein being assigned the same reference characters as in the co-pending application, namely 14, 44, 45, 46 and 58. Briefly, system 12 operates as follows: A sound pulse generated by means not shown is transmitted from transducer 14 along a highly directive transmission path. If a target is present in the path of the pulse, an echo is returned to the transducer, where it is converted to an electrical signal. A portion of the signal received by the transducer is fed through intermediate signal forming circuitry (not shown) to azimuth and depth phase sensitive indicators 44 and 45 which provide the steering control signal. Another portion of the signal received by the transducer is fed to an amplitude gate 58 which alternatively blocks or passes the signal depending on its amplitude. When the signal appearing at transducer 14 exceeds, or is at least equal to, a preselected level of acoustic input, sometimes known as the "threshold" of the gate, the signal is passed and amplified and fed to a relay 46 energizing same. When the signal level is below the "threshold" of the gate it is blocked and relay 46 is in its un-energized condition. Energization of relay 46 actuates contacts associated with detectors 44 and 45 passing the steering control signals to terminals 22 and 24, which are connected to the steering actuators when the torpedo steering system is connected as intended for its ultimate usage to attack a target. Thus amplitude gate 58 and relay 46 comprise a self acting mechanism which connects the steering signal output of system 12 to the rudder actuators in response to the presence of an acoustic level in excess of the gate threshold. It is to be understood, however, that for the purposes of a test run in accordance with the present invention, terminals 22 and 24 are not connected to the actuators, for reasons hereinafter made clear.

The operation of system 12 as so far described takes no account of self noises. These noises are sensed by translucer 14 and act upon system 12 the same as actual target signal. If their level exceeds the threshold of gate 58 they will energize relay 46, and if the torpedo steering system were connected as intended for its ultimate usage, the torpedo would steer erratically under the stimuli of the self noise.

The depth rudder positioning actuator 16 is of the type responsive to an A.C. (alternating current) control signal which is alternatively (1) of the "in phase" or "zero phase" condition, or (2) of the "opposed phase" or "180° phase" condition, relative to an A.C. reference signal. For example, in its most simplified form actuator 16 may consist of a conventional A.C. servo motor geared to the depth rudder and having input 26 connected to a reference A.C. signal and having an input 28 for a control signal. When a control signal of one of the opposite phase conditions is applied to input 28 the servo motor rotates in one direction and when a control signal of the other phase condition is applied the servo motor rotates in the other direction, the torque in both instances being proportional to the magnitude of the control signal.

Relay 46 is provided with a single pole double throw contact arrangement 30 consisting of a movable pole member 32 and upper and lower (as they appear in drawing) stationary contacts 34 and 36. Pole element 32 is resiliently restrained in engagement with contact 34 when relay 46 is not energized, and actuable into engagement with lower contact 36 when energized. A transformer 38 has a primary winding energized by the reference A.C. signal and a secondary winding provided with center tap 40 and upper and lower terminals 42 and 48 connected to stationary contacts 34 and 36, respectively. A resistor 50 has its upper end 52 connected to center tap 40 of the transformer secondary winding and its lower end 54 connected to movable pole 32 of the relay arrangement. Transformer 38 constitutes the well known phase splitting construction in which the signal appearing at upper terminal 42 relative to center tap 40, and the signal appearing at lower terminal 48 relative to tap 40 are of opposite phase polarities. Thus, relay contact arrangement 30, transformer 38 and resistor 50, together form a phase reversing switch for applying one or the other of opposite phase polarities across resistor 50 depending upon whether or not relay 46 is energized.

Resistor 50 is provided with an adjustable tap 56, and the signal $S_1$ appearing between its lower end 54 and tap 56 is applied to the input 28 of actuator 16 through conductors 60, 62 with the connection so made that the phase condition of signal $S_1$ when realy 46 is energized causes the torpedo to steer down and the phase condition of signal $S_1$ when relay 46 is not energized causes the torpedo to steer up. A conventional resiliently restrained gyroscope 64 for sensing angular rate of turn in depth steering is rigidly mounted to the torpedo body 66. Gyro 64 is of the type having a field winding 67 connected to the A.C. reference signal source and having a rotor winding 68 across which appears an output signal $S_2$ alternatively of one or the other of opposite phase polarities depending on the direction of turn in depth steering and having a magnitude proportional to the angular rate of turn. Winding 68 is series connected in line 62 with the connection so made that signal $S_2$ is subtracted from signal $S_1$ in their application to input 28 of actuator 16. As is well understood by those skilled in the art, such combination of signals tends to cause the torpedo to steer with a fixed rate turning determined by the relative magnitudes of signals $S_1$ and $S_2$, which rate may be adjusted by means of tap 56 on resistor 50.

From the above description it will be apparent that the control apparatus of torpedo 10, requires only a very few inexpensive parts in addition to those already existing in the torpedo to be tested. For example, the contacts 30 of relay 46 may be the contacts which are unused due to the disconnection of phase detectors 44 and 45 from the steering actuator. The A.C. reference signal and the pitch rate gyro are typically already present in a torpedo undergoing test. Therefore only inexpensive transformer 38 and resistor 50 are additionally needed.

*Operation*

In conducting a test run of torpedo 10 for purposes of determining the average maximum operating depth of torpedo 10 at which self noise actuates gate 58, the torpedo is launched in any suitable manner. Upon launching, the steering actuators are initially controlled by a timer type programmer 69 of any conventional design, which causes the torpedo to steer to a preselected depth within the high noise stratum. Self noise appears at transducer 14, including noise N, FIG. 1, directly radiating from propellers 20, and noise RR' reflected from air-to-water interface. At some preselected time intended to insure the torpedo is on a steady course, programmer 69 switches the steering system to the foregoing described condition in which the combined signals $S_1$ and $S_2$ are applied to actuator 16.

Figure 3:
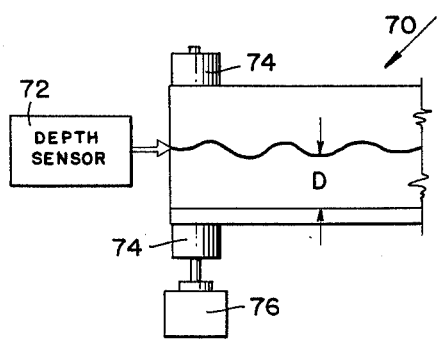
FIG. 3 shows a detail of a recording mechanism in the torpedo of FIG. 1.

As hereinbefore stated the level of self noise in the high noise stratum increases as the operating depth becomes shallower, and it is to be assumed that at some nominal depth intermediate the surface and the lower boundary of the high noise stratum, the level of self noise equals the threshold of amplitude gate 58. From the foregoing description of the steering control system it will be readily understood that when the torpedo is above such nominal depth it will steer down and when it is below such nominal depth it will steer up, and accordingly the torpedo will eventually follow a path that oscillates above and below such nominal depth. Contained in torpedo 10 is conventional depth recorder 70, best shown in FIG. 3, of the type in which a recording chart is continuously moved past a scribe actuated by depth sensor 72 by means of a drum 74 driven by a motor 76. Thus the instantaneous depths of the torpedo are recorded on the chart as the distance D between the line generated by the scribe upon the moving chart and a reference line. The nominal depth about which the torpedo oscillates may be readily determined by examination of the chart after the torpedo completes its run and is retrieved.

If desired, programming device 69 may be adapted to vary the sensitivity of acoustic system 12 by a suitable operative connection shown by dotted lines 78, or to vary the propulsion speed by a suitable connection to motor 21 shown by dotted lines 80, and thereby obtain by a single torpedo run the relationship between acoustic system sensitivity or propulsion system speed and the nominal depth at which self noise equals the threshold of amplitude gate 58.

Although the invention has been illustrated and described in connection with determining the relationship between depth and self noise interference for an acoustic torpedo in the high noise stratum, the invention is not limited thereby but is adaptable to other uses such as determining the relationship between depth and self noise interference for a submarine or a towed submerged sonar receiver, and including other circumstances where self noise varies with depth such as the reflection of sound from the ocean bottom or from interfaces between water layers have different temperature characteristics.

Obviously many modifications and variations of the present invention are possible in the light of the above teachings. It is therefore to be understood that within the scope of the appended claims the invention may be practiced otherwise than as specifically described.

What is claimed is:

1. Test apparatus for use with an acoustic torpedo during a self-noise test run, said torpedo being of the type having a directional transducer and a steering control change-over switch responsive to amplitude of signal level at the electrical output side of the transducer, during a normal operational run of said torpedo said change-over switch being operative to couple a transducer responsive homing signal to a means for steering the torpedo when said amplitude is above a predetermined switch actuation threshold and operative to decouple the homing signal and the means for steering when said amplitude is below the predetermined threshold level, said homing steering signal including a depth homing signal, said means for steering including a depth steering signal input and during an operational run there being provided a means for coupling the depth homing signal to said depth steering signal input, said self noise test run being along a path through a body of water substantially free of sources of target signals and being for the purpose of determining the maximum self noise interference depth, when the torpedo runs through the water above said depth the change-over switch being susceptible to undesired actuation to its homing signal coupling condition in response to self noise generated by the torpedo, said test apparatus, in combination, comprising;

(a) means responsive to said change-over switch for generating a self noise dependent steering signal to steer the torpedo downward when the change-over switch is in its homing signal coupling condition and to steer the torpedo upward when the change-over switch is in its homing signal de-coupling condition, said means for generating a self noise dependent signal being operatively connected to the depth steering signal input of the means for steering the torpedo in lieu of said means for coupling and when the homing signal is decoupled from the means for steering, to thereby steer the torpedo along a path oscillating about the average maximum depth at which self noise causes said undesired actuation of the change-over switch, and (b) means for recording a plot of instantaneous depth of the torpedo during said self noise test run, whereby said average maximum depth may be determined by inspection of the plot.

2. Apparatus in accordance with claim 1, said means for steering the torpedo being of the type responsive to phase and magnitude of an A.C. signal and including a rate gyro adapted to sense angular velocity of the torpedo in depth and operative to produce a rate gyro signal having an amplitude and phase depending upon the magnitude and sense of angular velocity at its output, the rate gyro signal being applied to the depth steering signal input and adapted to buck the depth homing signal during a normal operational run, and said change-over switch having a switch pole alternatively connected to first and second contacts, (c) said means for generating a self noise dependent signal comprising a transformer having its primary winding energized by an A.C. source and having a center tapped secondary winding and having one and the other ends of said secondary winding connected to said first and second contacts, respectively, said switch pole and said center tap being connected across the depth steering input.

3. A method for determining the self noise interference depth characteristics of an acoustic torpedo during a test run, said torpedo being of the type having a directional transducer and a steering control change-over switch responsive to signal level at the electrical output side of the transducer, during a normal operational run of said torpedo, said change-over switch being operative to be in a first switch condition for coupling a transducer responsive homing signal to a means for steering the torpedo when said amplitude is above a predetermined switch actuation threshold, and operative to be in a second switch condition for decoupling the homing signal and the means for steering when said amplitude is below the predetermined threshold level, the self noise interference depth being the maximum depth at which the change-over switch is susceptible to undesired actuation in response to self noise generated by the torpedo, said method comprising the steps of:

(a) steering the torpedo along a desired azimuth path through a body of water substantially free of sources of target signals and in the range of depths adjacent the surface of the water in which the amplitude of self noise picked up by the transducer increases in an inverse relationship to the depth of the torpedo, (b) steering the torpedo in depth during its travel along said azimuth path to cause the torpedo to be steered downwardly when the change-over switch is in its first condition and to cause the torpedo to be steered upwardly when the change-over switch is in its second switch condition, and (c) recording a plot of instantaneous depths of said torpedo.

4. A method in accordance with claim 3 wherein the signal at the electrical output side of the transducer is coupled to the change-over switch through a variable sensitivity means, and the further step of:

(d) varying the sensitivity of the variable sensitivity means in a predetermined manner during the test run, whereby the recorded plot provides a self noise interference depth-sensitivity curve.

References Cited in the file of this patent

UNITED STATES PATENTS

| | | |
|---|---|---|
| 2,402,617 | Fetzer et al. | June 25, 1946 |
| 3,002,482 | Montgomery | Oct. 3, 1961 |
| 3,003,449 | Wiebusch | Oct. 10, 1961 |
| 3,015,297 | Supernaw | Jan. 2, 1962 |
| 3,049,087 | Conley et al. | Aug. 14, 1962 |